(12) United States Patent
Kato

(10) Patent No.: US 9,915,086 B2
(45) Date of Patent: Mar. 13, 2018

(54) TRIAXIAL HINGE AND ELECTRONIC DEVICE USING THE SAME

(71) Applicant: KEM HONGKONG LIMITED, Tsimashatsui, Kowloon (HK)

(72) Inventor: Hideo Kato, Kanagawa (JP)

(73) Assignee: KEM HONGKONG LIMITED, Tsimshatsui, Kowloon (HK)

( * ) Notice: Subject to any disclaimer, the term of this patent is extended or adjusted under 35 U.S.C. 154(b) by 0 days.

(21) Appl. No.: 15/590,116

(22) Filed: May 9, 2017

(65) Prior Publication Data
US 2017/0328102 A1   Nov. 16, 2017

(30) Foreign Application Priority Data
May 12, 2016 (JP) ................. 2016-096374

(51) Int. Cl.
*E05D 3/12* (2006.01)
*E05D 7/00* (2006.01)
*G06F 1/16* (2006.01)

(52) U.S. Cl.
CPC ............... *E05D 3/122* (2013.01); *E05D 7/00* (2013.01); *G06F 1/1681* (2013.01); *E05Y 2201/71* (2013.01); *Y10T 16/541* (2015.01)

(58) Field of Classification Search
CPC . E05D 3/06; E05D 3/122; E05D 7/00; H04M 1/022; H04M 1/0216; G06F 1/1681; G06F 1/1616; G06F 1/1618; H05K 5/0226; E05Y 2201/71; E05Y 2900/606; Y10T 16/541; Y10T 16/547; Y10T 16/540225; Y10T 16/5387

USPC ............ 16/354, 366, 330, 303; 379/433.13; 455/575.3; 361/679.27, 679.06

See application file for complete search history.

(56) References Cited

U.S. PATENT DOCUMENTS

| | | | | |
|---|---|---|---|---|
| 7,805,810 | B2 * | 10/2010 | Hoffman | E05D 3/127 16/354 |
| 8,966,715 | B1 * | 3/2015 | Chen | G06F 1/1681 16/303 |
| 9,021,657 | B2 * | 5/2015 | Park | H05K 5/0226 16/354 |
| 9,127,490 | B2 * | 9/2015 | Chen | E05D 3/122 |
| 9,309,705 | B2 * | 4/2016 | Hsu | G06F 1/1681 |
| 9,310,849 | B2 * | 4/2016 | Hsu | E05D 3/122 |
| 9,342,101 | B2 * | 5/2016 | Hsu | G06F 1/1616 |

(Continued)

FOREIGN PATENT DOCUMENTS

JP        2016-001052 A       7/2016

*Primary Examiner* — William Miller
(74) *Attorney, Agent, or Firm* — Notaro, Michalos & Zaccaria P.C.

(57) ABSTRACT

The triaxial hinge includes a first hinge shaft attached to a first casing via a first bracket, a second hinge shaft attached to a second casing via a second bracket and a third hinge shaft coupled to one end portion of a first coupling part and one end portion of a second coupling part. Respective other end portions of both coupling parts are attached to the first hinge shaft. There is a gear type synchronous rotation unit for transmitting a rotation of one of the first hinge shaft and the second hinge shaft accompanied by an opening and closing operation of the both casings to the other hinge shaft via the third hinge shaft, which is made to move in a forward and backward direction as accompanied by an opening and closing operation of the both casings.

6 Claims, 17 Drawing Sheets

(56) References Cited

U.S. PATENT DOCUMENTS

| | | | | |
|---|---|---|---|---|
| 9,464,471 | B1* | 10/2016 | Chen | G06F 1/1681 |
| 9,524,000 | B2* | 12/2016 | Hsu | G06F 1/16 |
| 2009/0070961 | A1* | 3/2009 | Chung | E05D 3/122 |
| | | | | 16/354 |
| 2011/0000136 | A1* | 1/2011 | Brun | E05D 3/06 |
| | | | | 49/358 |
| 2015/0267450 | A1* | 9/2015 | Chiang | G06F 1/1681 |
| | | | | 16/354 |
| 2015/0342068 | A1* | 11/2015 | Su | G06F 1/1681 |
| | | | | 16/354 |
| 2016/0048174 | A1* | 2/2016 | Hsu | G06F 1/1681 |
| | | | | 16/342 |
| 2016/0090763 | A1* | 3/2016 | Hsu | E05D 3/06 |
| | | | | 16/354 |

\* cited by examiner

TRIAXIAL HINGE AND ELECTRONIC DEVICE USING THE SAME

FIELD OF THE INVENTION

The invention relates to a triaxial hinge suitably used in an electronic device, in particular a thin notebook PC. The invention further relates to an electronic device using such a triaxial hinge.

BACKGROUND ART

Conventionally, a biaxial hinge which couples a first casing provided with a display portion and a second casing provided with a keyboard portion such that these casings can open and close relative to each other via a synchronous rotation mechanism is known from JP Laid-Open Patent Application No. 2016-1052. The synchronous rotation mechanism of the known biaxial hinge comprises a first gear and a second gear respectively attached to a first hinge shaft and a second hinge shaft, an intermediate gear provided between a first gear and a second gear; the synchronous rotation mechanism is structured such that it allows the first casing and the second casing to open and close in a synchronized manner. Since the reduction of the distance between the first hinge shaft and the second hinge shaft has its limits, the reduction of thickness of each of the first casing and the second casing also has its limits. In recent years, the thickness of the notebook PC needs to be reduced, and especially the one using a thin flexible display plate on a display portion requires hinges which are respectively provided with a synchronous rotation mechanism and can couple a first casing and a second casing, wherein both casings are made thin, such that they are openable and closable relative to each other.

One object of the invention is to provide a triaxial hinge which is compatible with a first casing and a second casing, wherein both casings are made thin, as well as can efficiently and quickly open and close both casings in synchronized manner; furthermore, another object of the invention is to provide an electronic device using such a triaxial hinge.

SUMMARY OF THE INVENTION

To solve the above-mentioned problem, a triaxial hinge according to the invention is characterized in that it couples a first casing and a second casing, such that these casings are openable and closable relative to each other, wherein the triaxial hinge comprises: a first hinge shaft attached to a first bracket attached to a first attaching plate on the first casing side, wherein a rotation of the first hinge shaft is restrained by the first bracket; a second hinge shaft attached to a second bracket attached to a second attaching plate on the second casing side, wherein a rotation of the second hinge shaft is restrained by the second bracket; a third hinge shaft coupled to one end portion of a first coupling member and one end portion of a second coupling member, wherein respective other end portions of the first coupling member and the second coupling member are attached to the first hinge shaft; and a synchronous rotation mechanism for transmitting a rotation of one of the first hinge shaft and the second hinge shaft accompanied by an opening and closing operation of the first casing and the second casing to the other hinge shaft via the third hinge shaft, wherein the synchronous rotation mechanism allows the third hinge shaft to move in a forward and backward direction, as accompanied by an opening and closing operation of one of the first casing and the second casing, as well as the other casing to automatically open and close.

The above-mentioned invention is further characterized in that the synchronous rotation mechanism comprises: a first hinge shaft attached to a first bracket, wherein a rotation of the first hinge shaft is restrained by the first bracket; a second hinge shaft attached to a second bracket, wherein a rotation of the second hinge shaft is restrained by the second bracket; drive gears on the first bracket and the second bracket; a turning member comprising a driven gear meshed with the drive gear provided on the first bracket, wherein a third hinge shaft and the second hinge shaft rotatably pass through the turning member; a further turning member comprising a driven gear meshed with the drive gear provided on the second bracket, wherein the third hinge shaft and the first hinge shaft rotatably pass through the turning member.

The above-mentioned invention is further characterized in that the synchronous rotation mechanism comprises a stopper means for stopping the first casing and the second casing at a predetermined opening angle.

The above-mentioned invention is further characterized in that each of the first hinge shaft and the second hinge shaft comprises friction mechanisms.

The above-mentioned invention is further characterized in that each of the first hinge shaft and the second hinge shaft comprises drawing mechanisms.

The above-mentioned invention is further characterized in that a first shaft end coupling member is attached to shaft end portions of the first hinge shaft and the third hinge shaft of one triaxial hinge and thereby hung between said shaft end portions and the ones of a first hinge shaft and a third hinge shaft of an adjacent triaxial hinge, and that a second shaft end coupling member is attached to shaft end portions of the second hinge shaft and the third hinge shaft of one triaxial hinge and thereby hung between the shaft end portions and the ones of a second hinge shaft and a third hinge shaft of an adjacent triaxial hinge.

Still further, the electrical device according to the invention is characterized in that it uses a triaxial hinge according to the above-mentioned aspects.

The present invention is constructed as described above, therefore, when a first casing of an electronic device equipped with a triaxial hinge according to the invention is opened and closed relative to a second casing, a first bracket attached to the first casing rotates together with a first hinge shaft around its axis, by means of a synchronous rotation mechanism of the triaxial hinge; and as accompanied by a rotation of the first bracket, turning members rotate on one end side around a third hinge shaft in an opposite direction, so that the turning members also rotate on other end side in the opposite direction. A second hinge shaft passes through the other end of the turning members, and the second bracket is equipped with the second hinge shaft. In this manner, the second casing attached to the second bracket rotates around the third hinge shaft in an opposite direction of a rotation of the first casing, so that an opening and closing operation of the first casing and the second casing is achieved. This also applies to an opening and closing operation of the second casing relative to the first casing on the contrary to what is described above. In these cases, a first hinge shaft and a second hinge shaft rotates around a third hinge shaft, the third hinge shaft moves in a forward and backward direction as accompanied by an opening and closing operation of the first casing and the second casing. Especially when the first casing and the second casing are closed, the first hinge shaft and the second hinge shaft overlap each other, where the third hinge shaft has moved backward on an electronic device. Therefore, a center distance between the first hinge shaft and the second hinge shaft can be substantially reduced, which can then contribute to a thinner electronic device such as notebook PC. Still further, if one of the first casing and the second casing is opened and closed relative to the other casing, the latter also starts to open and close at the same time as described above, so that it is possible to provide a triaxial hinge which quickly opens and closes as well as enhances efficiency and ease of operation.

Still further, in a triaxial hinge according to the invention, a friction mechanism assures a stable stop of the first casing and a second casing at any opening and closing angle during a rotation of the first hinge shaft and the second hinge shaft by applying a friction torque. Additionally, a drawing mechanism enables an automatic rotation at the time of full opening and full closing, i.e. automatically closes the first casing and the second casing and stably maintains their closed state, or automatically opens them and stably maintains their opened state.

Still further, the invention can provide a thinner electrical device more convenient in carrying and handling by using the above-mentioned triaxial hinge according to the invention.

EMBODIMENTS

Hereinafter, reference is made to the embodiments in which a triaxial hinge according to the invention is applied to a notebook PC being an example of an electrical device, based on the drawings. However, targeted electrical devices using the triaxial hinge according to the invention are not limited to a notebook PC, but the triaxial hinge is also widely applicable to other electrical devices such as a mobile PC, electrical device such as PDA and others.

Figure 1A:
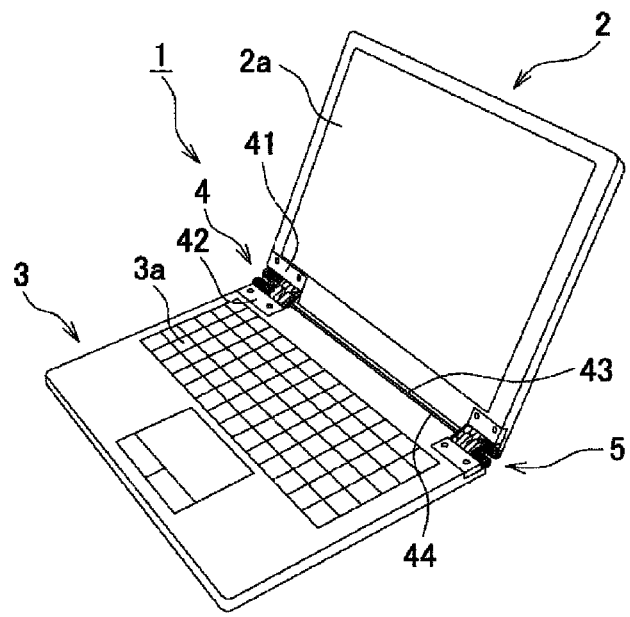
FIGS. 1A to 1C show a notebook PC being an example of an electrical device, with a triaxial hinge according to the invention being attached thereto, FIG. 1A being its perspective view with a second casing being opened 120 degrees relative to a first casing as seen from front side, FIG. 1B being its perspective view as seen from rear side, while the first casing and the second casing are closed, and FIG. 1C being its perspective view with the second casing being opened 180 degrees relative to the first casing as seen from above.
Figure 1B:
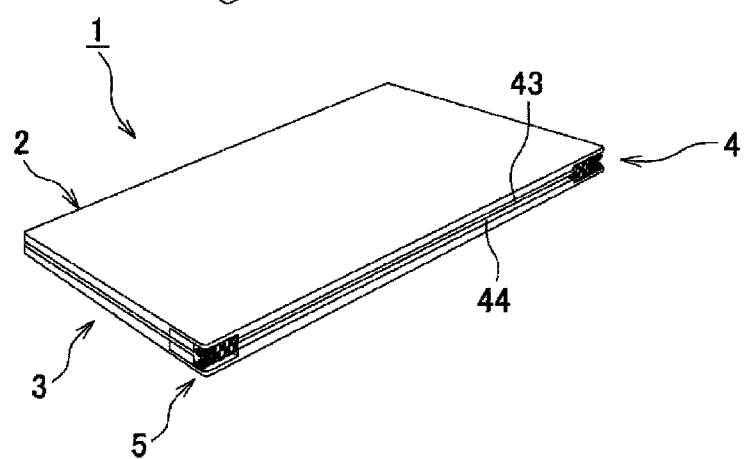
Figure 1C:
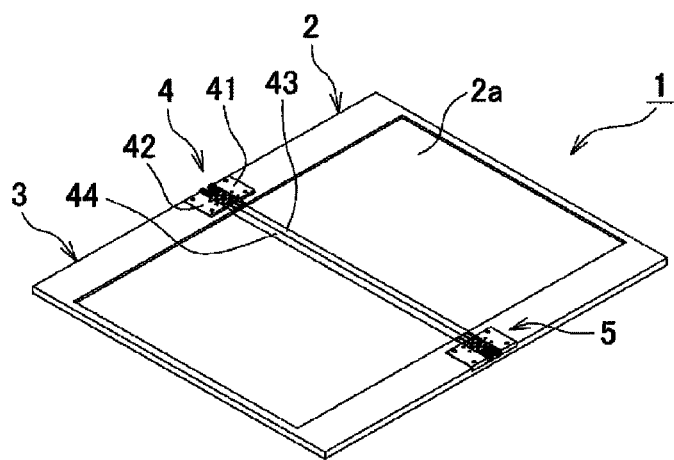

FIGS. 1A, 1B and 1C show a notebook PC 1 being an example of an electrical device using a triaxial hinge according to the invention. The notebook PC 1 comprises a first casing 2 provided with a key board portion 2a and a second casing 3 provided with a display portion 3a, wherein the casings are coupled via a pair of triaxial hinges 4 and 5 to each other at spots on the right and left sides of their respective rear portions, such that the casings can open and close relative to each other.

Since both triaxial hinges 4 and 5 have an identical structure, reference is made to a triaxial hinge 4 in the following, and not to other triaxial hinge 5, as long as reference to the latter is not especially necessary.

Figure 2:
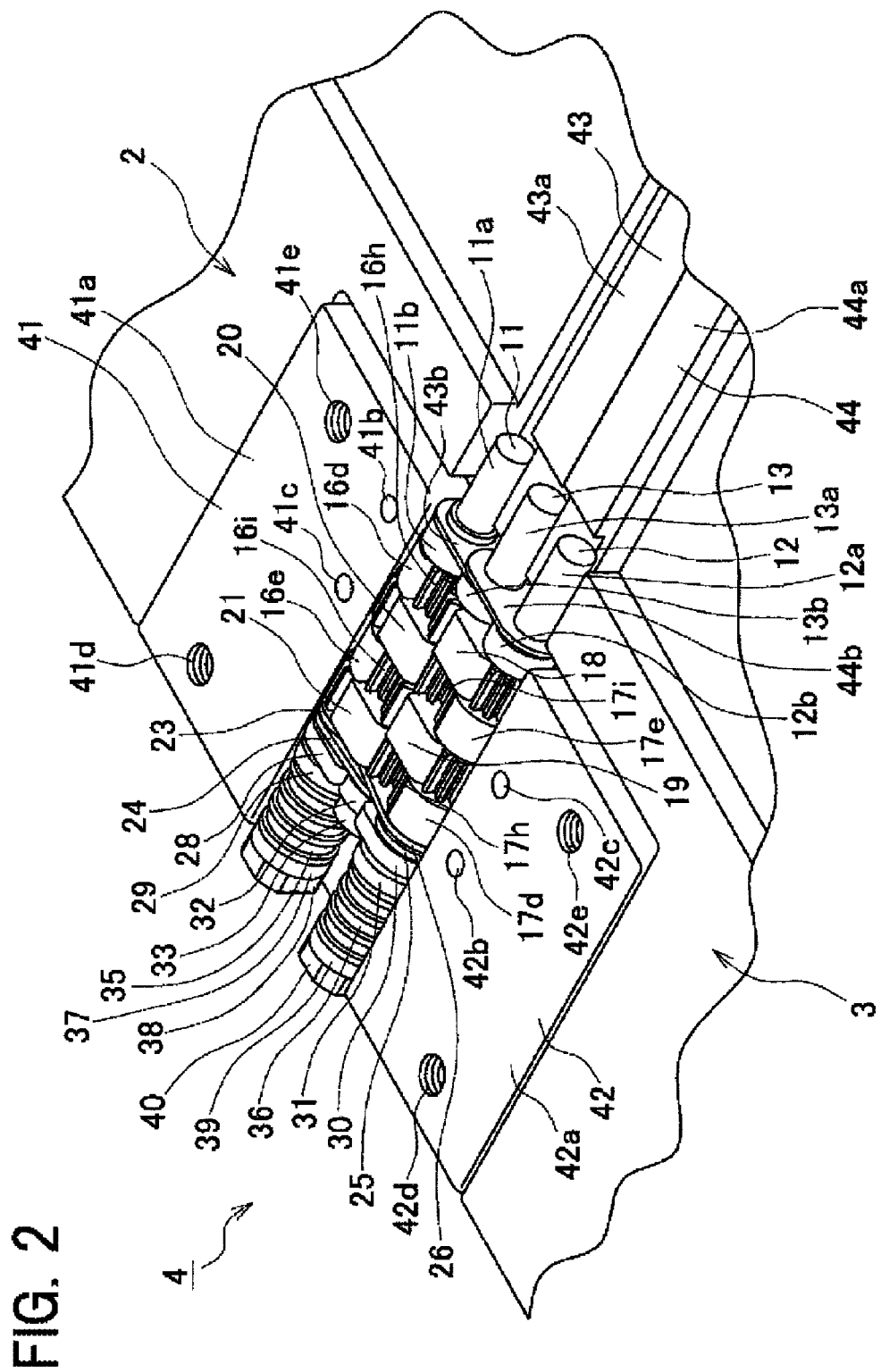
FIG. 2 is an explanatory view for illustrating a triaxial hinge according to the invention as attached to an electrical device.
Figure 3:
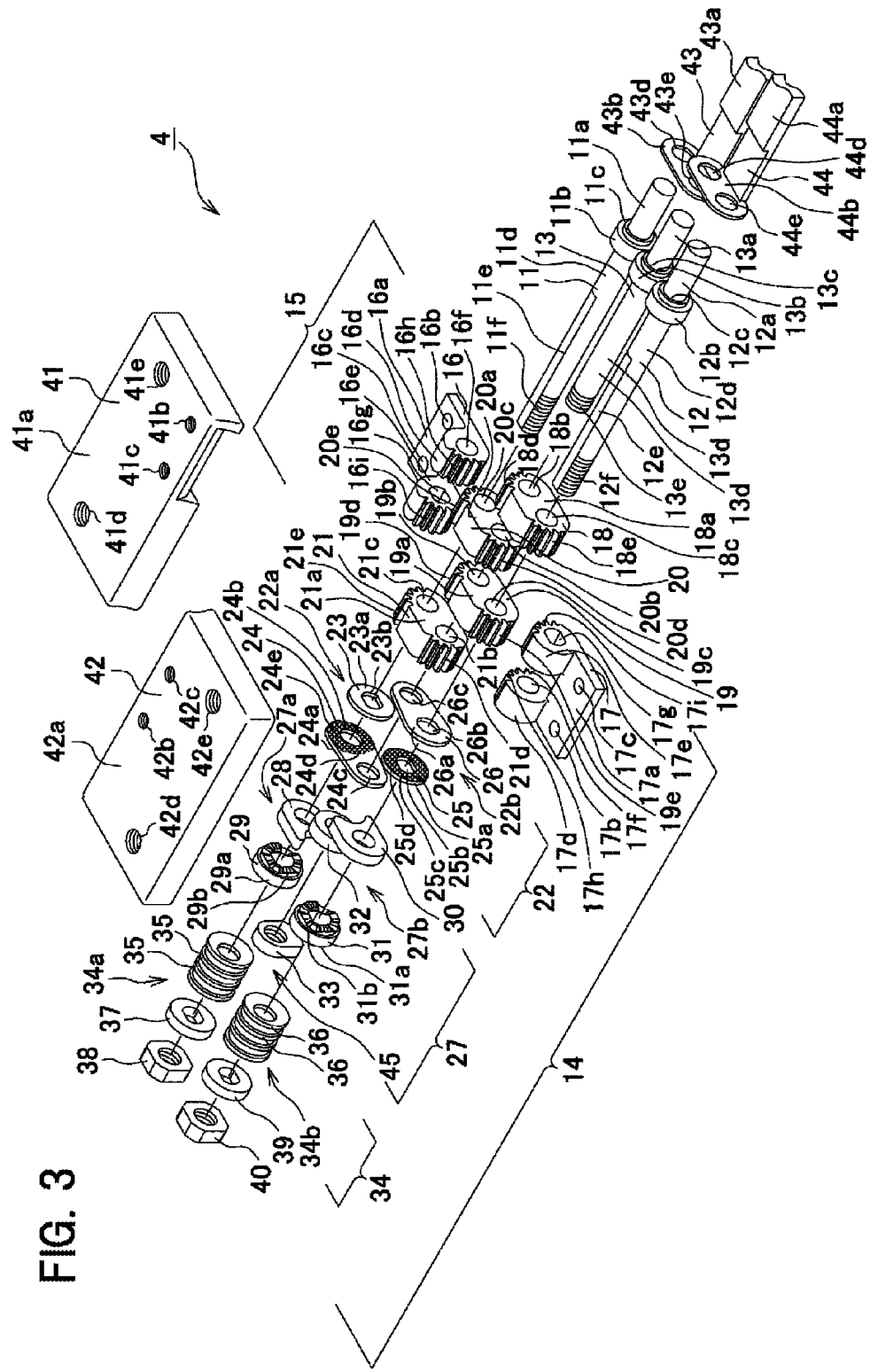
FIG. 3 shows an exploded perspective view of a triaxial hinge according to the invention.
Figure 4:
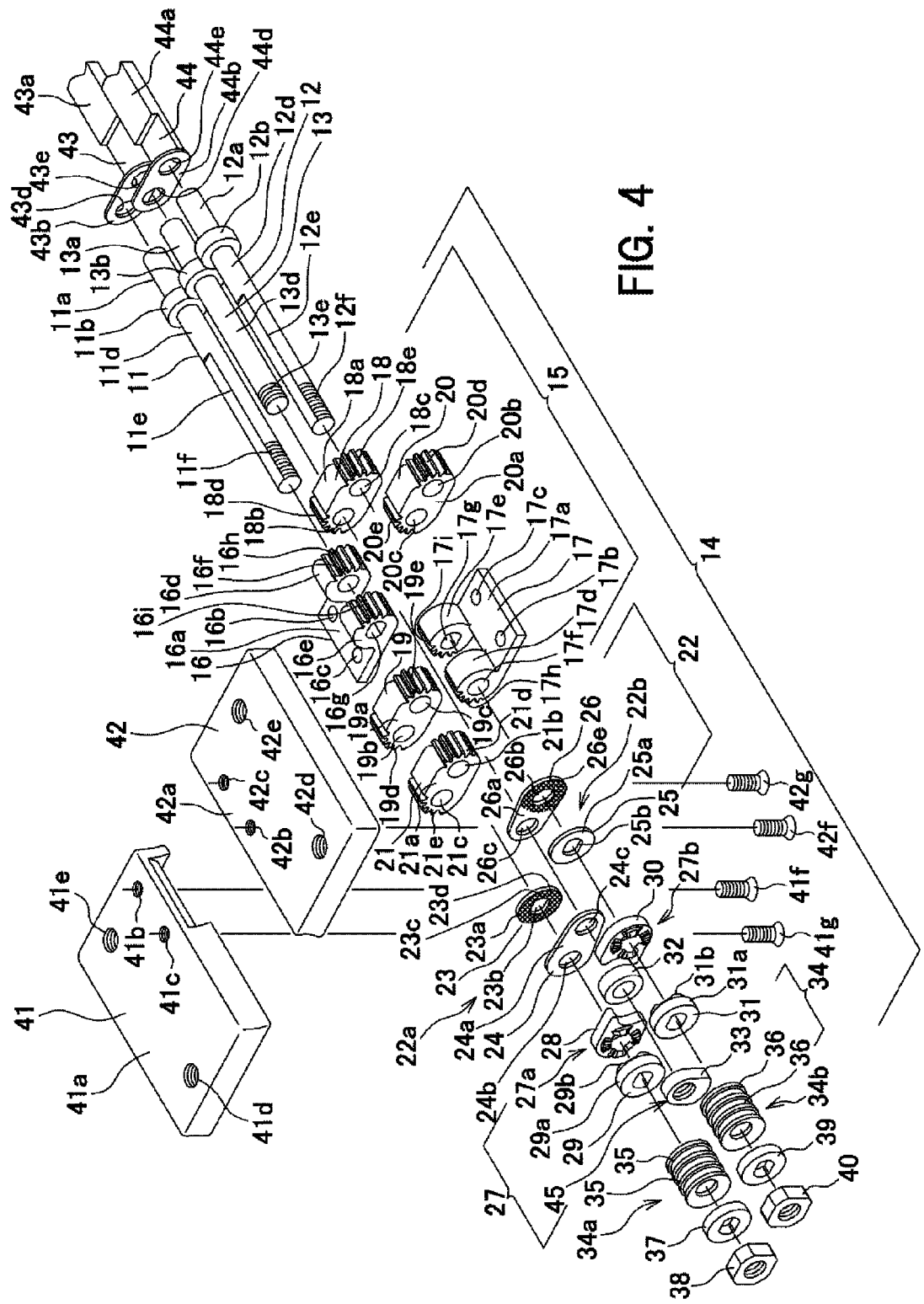
FIG. 4 shows an exploded perspective view of a triaxial hinge according to the invention as seen from a viewpoint different from FIG. 3.

FIGS. 2 to 16 show an embodiment of a triaxial hinge 4 according to the invention. As shown in FIG. 3, the triaxial hinge 4 according to the invention is assembled by attaching a rotation controlling means 14 onto a first hinge shaft 11, a second hinge shaft 12 and a third hinge shaft 13, and the rotation controlling means 14 roughly consists of a synchronous rotation mechanism 15, friction mechanisms 22, drawing mechanisms 27 and elastic means 34. The first hinge shaft 11 and the second hinge shaft 12 are assembled such that they are held in parallel to each other via the third hinge shaft 13, a first coupling member 24 and a second coupling member 26, wherein they are rotatable around the third hinge shaft 13. More specifically, the first hinge shaft 11 rotatably passes through a first circular shaft hole 24b provided on one end portion of a main body portion 24a of the first coupling member 24, while the third hinge shaft 13 rotatably passes through a second circular shaft hole 24c provided on other end portion of the main body portion. Similarly, the second hinge shaft 12 rotatably passes through a first circular shaft hole 26b provided on one end portion of a main body portion 26a of the second coupling member 26, while the third hinge shaft 13 rotatably passes through a second circular shaft hole 26c provided on other end portion of the main body portion. In this manner, the first hinge shaft 11 and the second hinge shaft 12 are coupled to each other such that they are rotatable around the third hinge shaft 13. In the meantime, in addition to the first coupling member 24 and second coupling member 26 as described above, a first shaft end coupling member 43 and a second shaft end coupling member 44 to be described below also play an auxiliary role for the purpose of holding the first hinge shaft 11 and the second hinge shaft 12 such that they are rotatable around the third hinge shaft 13.

Figure 5A:
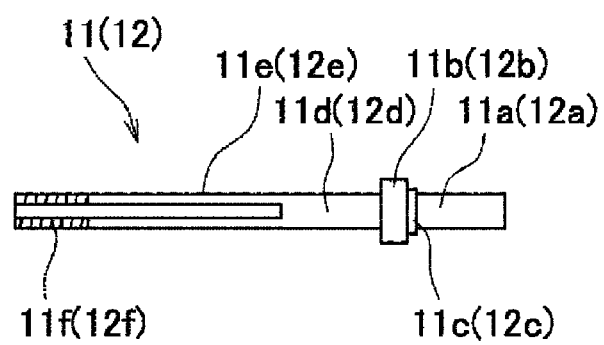
FIGS. 5A and 5B show a first hinge shaft (as well as a second hinge shaft) of a triaxial hinge according to the invention, FIG. 5A being its enlarged plan view, and FIG. 5B—its enlarged side view.
Figure 5B:
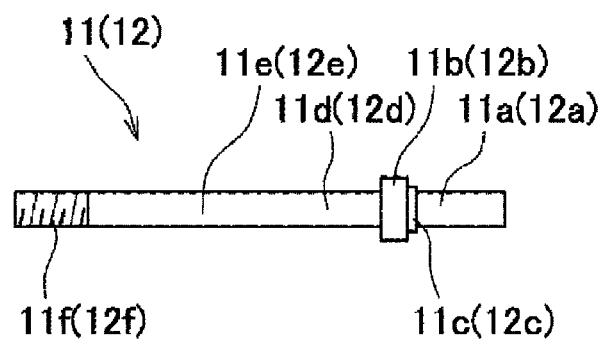

A first hinge shaft 11 has a structure as shown in FIGS. 5A and 5B (here the first hinge shaft 11 is shown as a separate piece; since a second hinge shaft 12 has an identical structure, reference numerals for its components are added to those of the first hinge shaft 11 in parenthesis in explanation on FIG. 5A, 5B and thereafter. The same applies to other components under similar condition), and comprises an extended end portion 11a (12a), a flange portion 11b (12b), a stepped portion 11c (12c), a circular shaft portion 11d (12d), a deformed shaft portion 11e (12e) with a flat cross section and a male screw portion 11f (12f). A third hinge shaft 13 (see FIG. 3) comprises an extended end portion 13a, a flange portion 13b, a stepped portion 13c, a circular shaft portion 13d and a male screw portion 13e. In the following, reference is made to particular components of a synchronous rotation mechanism 15, friction mechanisms 22, drawing mechanisms 27 and elastic means 34 which are attached onto the hinge shafts as described above.

As shown in FIG. 3, a synchronous rotation mechanism 15 comprises a first bracket 16, a second bracket 17, a first to a forth turning members 18 to 21, and is assembled by attaching these onto a first hinge shaft 11, a second hinge shaft 12 and a third hinge shaft 13 as described below.

Figure 6A:
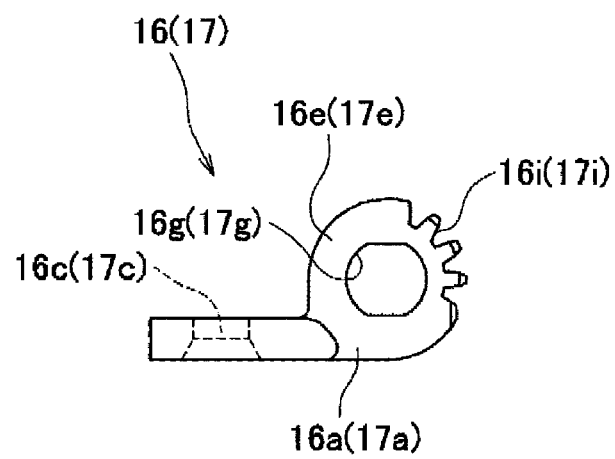
FIGS. 6A and 6B shows an enlarged perspective view of a first bracket (as well as a second bracket) of a triaxial hinge according to the invention.
Figure 6B:
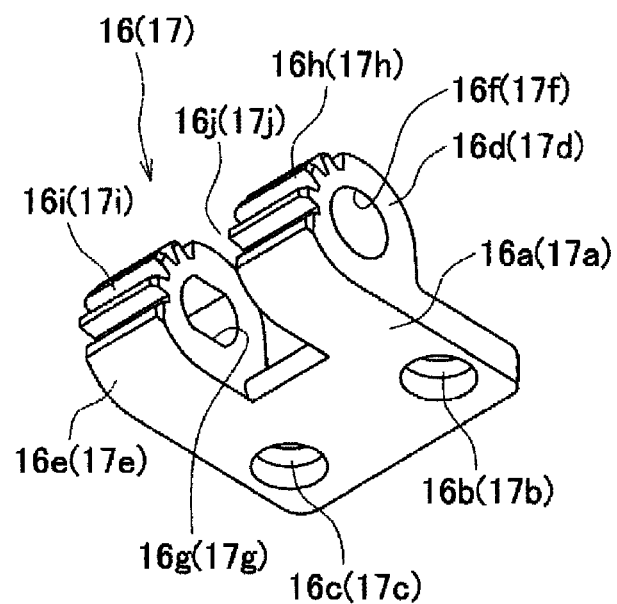
Figure 7:
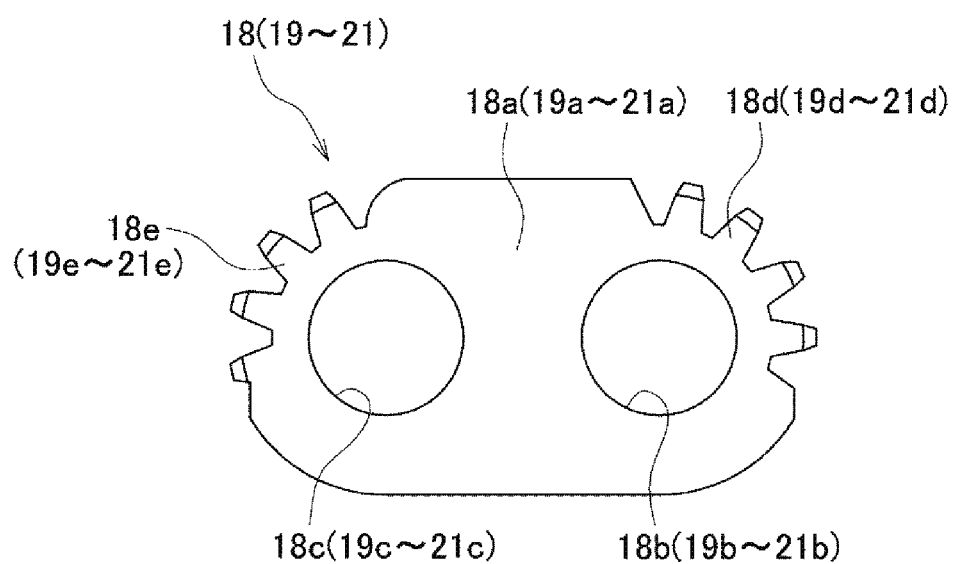
FIG. 7 shows an enlarged elevation view of a first turning member (as well as a second to a fourth turning members) of a triaxial hinge according to the invention.
Figure 8A:
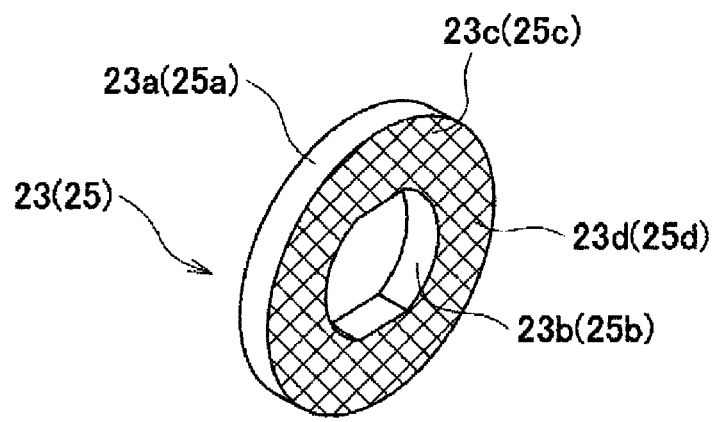
FIGS. 8A and 8B show an enlarged perspective view of a first bracket (as well as a second bracket) of a triaxial hinge according to the invention, FIG. 8A being its enlarged perspective view and FIG. 8B—its enlarged elevation view.
Figure 8B:
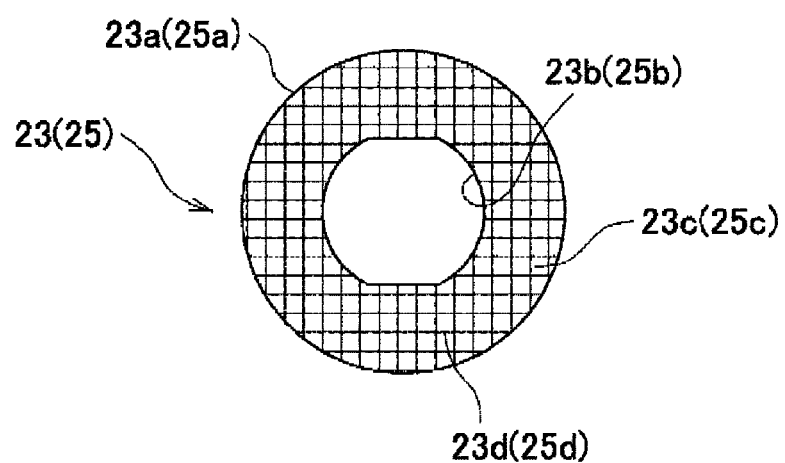
Figure 9A:
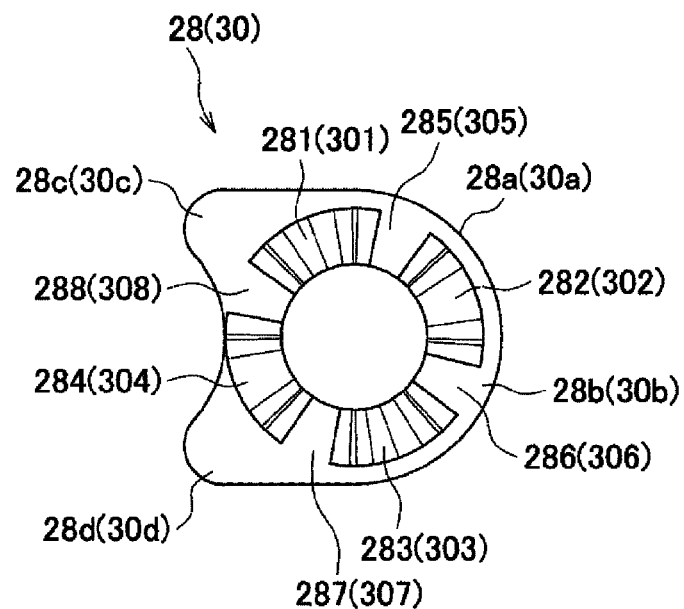
FIGS. 9A and 9B show a first cam disc (as well as a second cam disc) of a triaxial hinge according to the invention, FIG. 9A being its enlarged elevation view, and FIG. 9B—its enlarged side view.
Figure 9B:
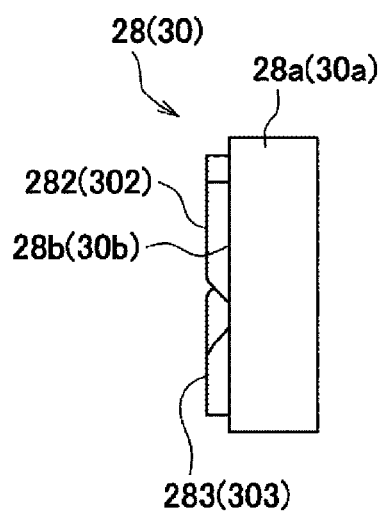
Figure 10A:
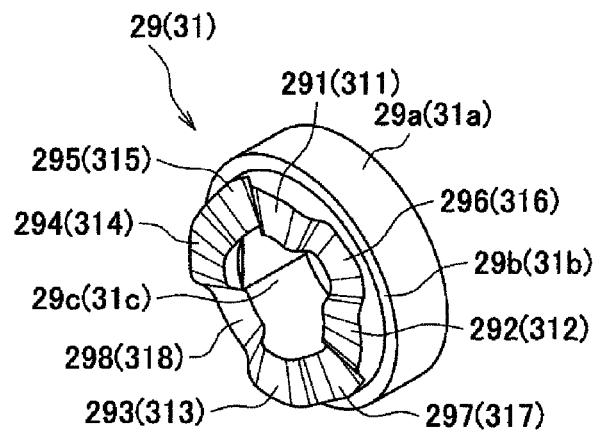
FIGS. 10A, 10B and 10C show a first cam follower (as well as a second cam follower) of a triaxial hinge according to the invention, FIG. 10A being its enlarged perspective view, FIG. 10B—its enlarged elevation view and FIG. 10C—its enlarged side view.
Figure 10B:
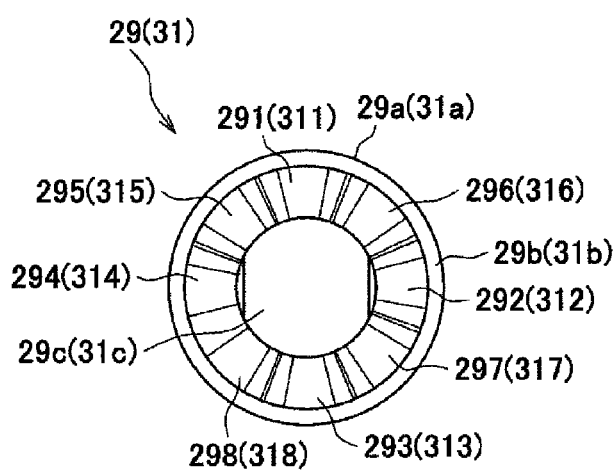
Figure 10C:
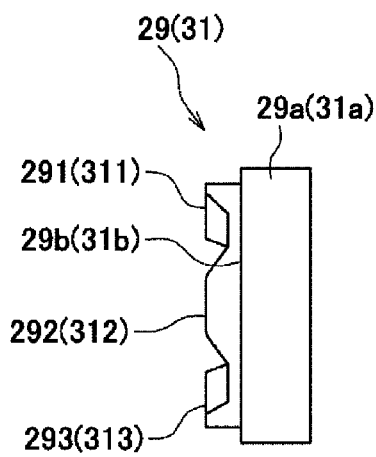
Figure 11A:
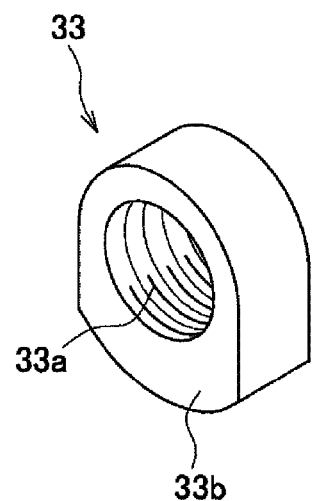
FIGS. 11A and 11B show a nut member of a triaxial hinge according to the invention, FIG. 11A being its enlarged perspective view and FIG. 11B—its enlarged elevation view.
Figure 11B:
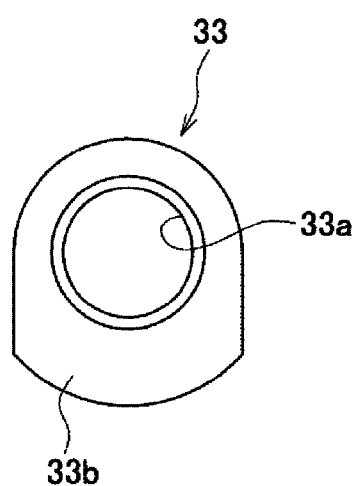
Figure 12A:
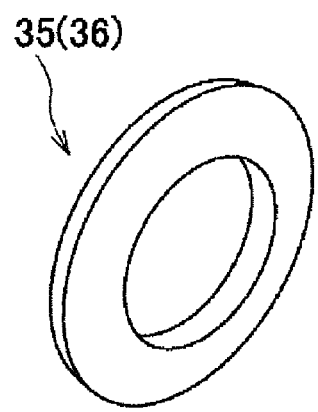
FIGS. 12A and 12B show one disc spring (as well as remaining disc springs) of a triaxial hinge according to the invention, FIG. 12A being its enlarged perspective view and FIG. 12B—its enlarged side view.
Figure 12B:
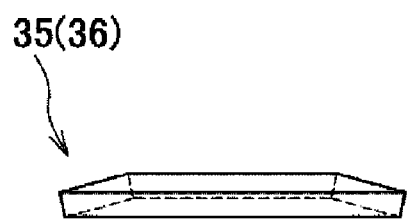
Figure 13A:
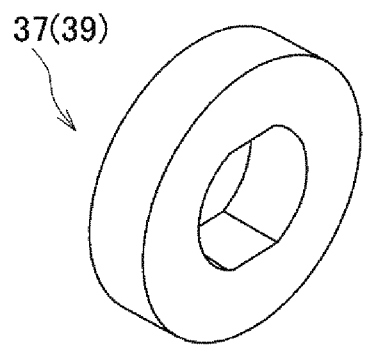
FIGS. 13A and 13B show a washer of a triaxial hinge according to the invention, FIG. 13A being its enlarged perspective view and FIG. 13B—its enlarged elevation view.
Figure 13B:
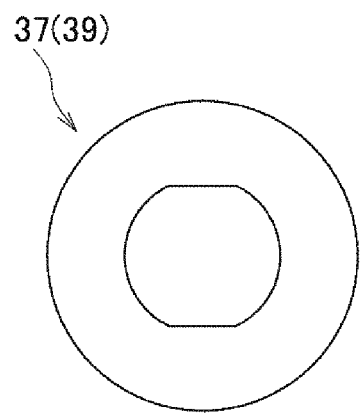
Figure 14:
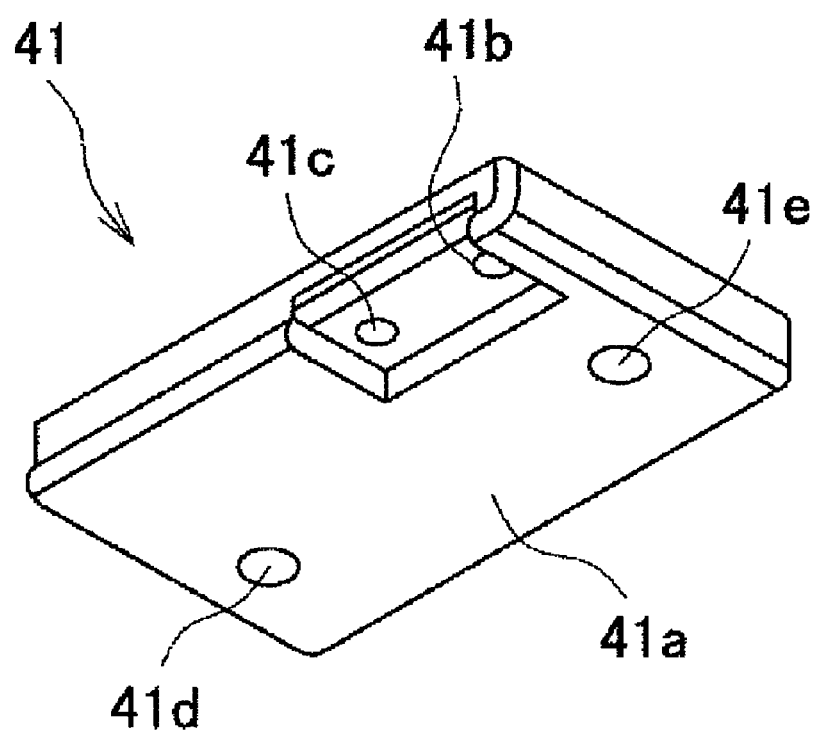
FIG. 14 shows a first attaching plate of a triaxial hinge according to the invention as seen from below in an enlarged perspective view.
Figure 15A:
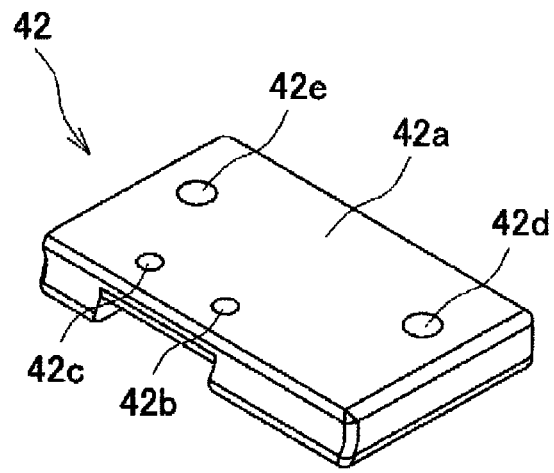
FIGS. 15A and 15B show a second attaching plate of a triaxial hinge according to the invention, FIG. 15A being its enlarged perspective view as seen from above, and FIG. 15B being its enlarged perspective view as seen from below.
Figure 15B:
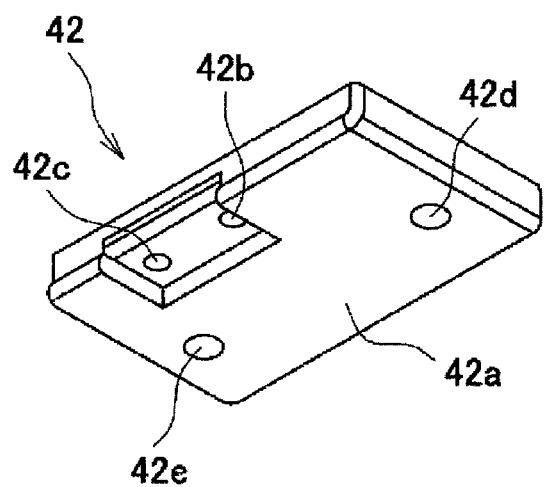

A first bracket 16 (a second bracket 17 also has an identical structure) is formed as shown in FIGS. 6A and 6B (here the first bracket 16 is shown as a separate piece), and comprises a main body portion 16a (17a), fixing screw holes 16b, 16c (17b, 17c), shaft supporting portions 16d, 16e (17d, 17e), a circular shaft hole 16f (17f), a deformed shaft hole 16g (17g), drive gears 16h, 16i (17h, 17i) and a slot 16j (17j). A first turning member 18 (second to the forth turning members 19 to 21 also have an identical structure) is formed as shown in FIG. 7 (here the first turning member 18 is shown as a separate piece), and comprises a main body portion 18a (19a to 21a), a first and a second circular shaft holes 18b, 18c (19b to 21b, 19c to 21c), and driven gears 18d, 18e (19d to 21d, 19e to 21e). In the meantime, one driven gear 18e of two driven gears 18d, 18e on the first turning member 18 as shown in FIG. 7 is not particularly necessary for an operation of the first turning member 18, but just provided for the sake of convenience in manufacturing and assembly. This gear is not necessary. This also applies to the remaining second to fourth turning members 19 to 21.

As shown in FIG. 3, a section of a first hinge shaft 11 from a circular shaft portion 11d to a deformed shaft portion 11e passes sequentially through a circular shaft hole 16f on one shaft supporting portion 16d of a first bracket 16, a second circular shaft hole 20c on a third turning member 20, a deformed shaft hole 16g on the other shaft supporting portion 16e of the first bracket 16 and a second circular shaft hole 21c on a fourth turning member 21. In this case, these parts are easily assembled for the sake of convenience of assembly work, if the following steps are taken: first, the first bracket 16, a second bracket 17 and the first to the fourth turning members 18 to 21 are preliminarily arranged as shown in FIG. 2, then these parts are set with their shaft holes being aligned, and finally the first hinge shaft 11 (the above procedures also apply to the second hinge shaft 12 and the third hinge shaft 13) passes through these shaft holes. When the first bracket 16, the third turning member 20 and the fourth turning member 21 are attached onto the first hinge shaft 11, the deformed shaft hole 16g of the first bracket 16 is non-rotatably restrained by a deformed shaft portion 11e of the first hinge shaft 11 and thus pivotally supported on the latter, so that the first bracket 16 as a whole is non-rotatably restrained by the first hinge shaft 11 and thus pivotally supported on the latter. On the other hand, a second circular shaft hole 20c of the third turning member 20 and a second circular shaft hole 21c of the fourth turning member 21 are pivotally supported on a deformed shaft portion 11e of the first hinge shaft 11 so as to be freely rotatable.

As is the case in a first hinge shaft 11, a section of a second hinge shaft 12 from a circular shaft portion 12d to a deformed shaft portion 12e passes sequentially through a second circular shaft hole 18c on a first turning member 18, a deformed shaft hole 17g on the one shaft supporting portion 17e of a second bracket 17, a second circular shaft hole 19c on a second turning member 19 and a circular shaft hole 17e on the other shaft supporting portion 17d of the second bracket 17, as shown in FIG. 3. When the second bracket 17, the first turning member 18 and the second turning member 19 are attached onto the second hinge shaft 12, the deformed shaft hole 17g of the second bracket 17 is non-rotatably restrained by a deformed shaft portion 12e of the second hinge shaft 12 and thus pivotally supported on the latter, so that the second bracket 17 as a whole is non-rotatably restrained by the second hinge shaft 12 and thus pivotally supported on the latter. On the other hand, a second circular shaft hole 20c of the third turning member 18 and a second circular shaft hole 21c of the fourth turning member 19 are pivotally supported on a deformed shaft portion 11e of the first hinge shaft 12 so as to be rotatable.

Next, a circular shaft portion 13d of the third hinge shaft 13 passes sequentially through a second circular shaft hole 18b on a first turning member 18, a second circular shaft hole 20c on a third turning member 20, a first circular shaft hole 19b on a second turning member 19 and a first circular shaft hole 21b on a fourth turning member 21, as shown in FIG. 3. In this manner, the first to the fourth turning members 18 to 21 are attached onto the circular shaft portion 13d of the third hinge shaft 13 as described above; here, each turning member is pivotally supported on the third hinge shaft 13, so as to be rotatable around the latter.

When a first bracket 16 and a second bracket 17 as well as a first to a fourth turning members 18 to 21 are attached onto a first hinge shaft 11, a second hinge shaft 12 and a third hinge shaft 13, a drive gear 16h of the first bracket 16 is meshed with a driven gear 18d of the first turning member 18, and the other drive gear 16i with a driven gear 19d of a second turning member 19. Similarly, a drive gear 17h of the second bracket 17 is meshed with a driven gear 21d of the fourth turning member 21, and the other drive gear 17i with a driven gear 20d of a third turning member 20.

A first bracket 16 is fixed to a first attaching plate 41 by screwing fixing screws 41f, 41g (see FIG. 4) into fixing holes 16b, 16c of the first bracket and fixing holes 41b, 41c of the first attaching plate 41, and the first attaching plate 41 is fixed to a first casing 2 of an electronic device such as notebook PC using fixing holes 41d, 41e of the first attaching plate. Similarly, a second bracket 17 is fixed to a second attaching plate 42 by screwing fixing screws 41f, 41g (see FIG. 4) into fixing holes 17b, 17c of the second bracket and fixing holes 42b, 42c of the second attaching plate 42, and the first attaching plate 42 is fixed to a second casing 3 of the electronic device such as notebook PC using fixing holes 42d, 42e of the second attaching plate.

Next, as shown in FIG. 3, friction mechanisms 22 consist of a first friction mechanism 22a provided on a first hinge shaft 11 and a second friction mechanism 22b provided on a second hinge shaft 12. In an embodiment in particular as shown in FIG. 3, the first friction mechanism 22a consists of a first friction washer 23 (see also FIGS. 8A and 8B), a first coupling member 24, and a first elastic means 34a provided on the first hinge shaft 11 for press contact between the two above components. In the meantime, since the second friction mechanism 22b has an identical structure, respective reference numerals relevant to the second friction mechanism 22b are added in parenthesis to those concerning the first friction mechanism, and thus redundant explanation is omitted hereinafter. A deformed shaft portion 11e (12e) of the first hinge shaft 11 (12) passes through a deformed shaft hole 23b (25b) provided on a main body portion 23a (25a) of a first friction washer 23 (25), so that the first friction washer is restrained so as to be movable in an axial direction but non-rotatable around the axis, and thus attached to the first hinge shaft 11 (12). Still further, the first hinge shaft 11 (12) rotatably passes through a first circular shaft hole 24b (26b) provided on the main body portion 24a (26a) of the first coupling member 24 (26) being a counterpart of the first friction washer 23 (25), while the third hinge shaft 13 rotatably passes through a second circular shaft hole 24c (26c) of the first coupling member 24 (26), as described above. A waffle-knurl pattern 23d (25d) is provided on a friction surface 23c (see FIGS. 8A and 8B) of the first friction washer 23 (25) facing the first coupling member 24 (26), and similarly a waffle-knurl pattern 24e on a friction surface 24d of the first coupling member 24 (26) facing the first friction washer 23 (25), so that a friction effect generated under press contact of the first friction washer and the first coupling member is enhanced.

As shown in FIG. 3, elastic means 34 consist of a first elastic means 34a and a second elastic means 34b. The first elastic means 34a for press contact between a first friction washer 23 and a first coupling member 24 in order to generate a friction effect between both is composed of a plurality of disc springs 35, 35 overlapping each other, and intended to generate an elastic force in an axial direction by fastening a fastening nut 38; it also functions as elastic means for a first drawing mechanism 27a to be described below. In the meantime, the second elastic means 34b for press contact between a second friction washer 25 and a second coupling member 26 in order to generate a friction effect between both is composed of a plurality of disc springs 36, 36 overlapping each other; it also functions as elastic means for a second drawing mechanism 27b to be described below.

As shown in FIG. 3, drawing mechanisms 27 consist of a first drawing mechanism 27a provided on the first hinge shaft 11 and a second drawing mechanism 27b provided on the second hinge shaft 12. Since a second drawing mechanism 27b has a structure identical to the first drawing mechanism 27a, respective reference numerals relevant to the second drawing mechanism 27b are added in parenthesis to those concerning a first friction mechanism, and thus redundant explanation is omitted hereinafter. In an embodiment in particular as shown in FIG. 3, the first drawing mechanism 27a (27b) comprises a first cam disc 28 (30) (see also FIGS. 9A and 9B) and a first cam follower 29 (31) (see also FIGS. 10A, 10B and 10C), a first to a fourth cam convex portions 281 to 284 are provided on a cam surface 28b of a main body portion 28a (30a) of the first cam disc 28 (30), at a regular interval of 90 degrees, as well as a first to a fourth cam concave portions 285 to 288 at the same interval. Moreover, rotation arresting projection portions 28c, 28d are provided on an outer circumferential surface of the main body portion 28a (30a) of the first cam disc 28 (30). Respective concave surfaces 28e, 28f of the rotation arresting projection portions 28c, 28d abut against outer circumferential surfaces of a spacer 32 (see FIG. 3) attached to a third hinge shaft 13. This arrangement prevents the first cam disc 28 (30) from rotating around the axis of a first hinge shaft 11, and when a first cam follower 29 rotates together with the first hinge shaft 11, the above arrangement prevents the first cam disc 28 (30) from rotating together with them. On the other hand, a first cam follower 29 (31) (see FIGS. 3 and 10A, 10B and 10C) of the first drawing mechanism 27a (27b) comprises a first to a fourth cam convex portions 291 to 294 formed on a cam surface 29b (31b) of a main body portion 29a (31a), at a regular interval of 90 degrees, as well as a first to a fourth cam concave portions 295 to 298 at the same interval. As elastic means for press contact between a cam surface 28b (30b) of the first cam disc 28 (30), a first elastic means 34a (34b) used for actuating a first friction mechanism 22a (22b) is also applicable to the first drawing mechanism 27a (27b).

After respective components of a synchronous rotation mechanism 15, friction mechanisms 22, drawing mechanisms 27 and elastic means 34 are mounted to the first hinge shaft, a fastening nut 38 (40) is screwed onto the male screw portion 11f (12f) on the tip of the first hinge shaft 11 (12) via a washer 37 (39), and an elastic force applied by the first elastic means 34a (34b) to the friction mechanisms 22 and the drawing mechanisms 27 is adjusted depending on the fastening amount of the fastening nut. A nut member 33 (see FIGS. 11A and 11B) also functioning as stopper means is screwed onto a male screw portion 13e on the tip of the third hinge shaft 13. A projecting portion 33b is provided on a side opposite to the screw hole 33a in a radial direction on the nut member 33 also functioning as stopper means. Respective outer circumferences of a first cam follower 29 and a second cam follower 31 turning around the third hinge shaft 13 as a fulcrum abut against the projecting portion 33b, when the first casing 2 and the second casing 3 are opened and closed, thus the projecting portion controls the first casing 2 and the second casing 3 so as not to rotate more than 90 degrees. Accordingly, stopper means consists of the projecting portion 33b provided on a nut member 33 and the outer circumferences of a first cam follower 29 and a second cam follower 31.

Figure 16:
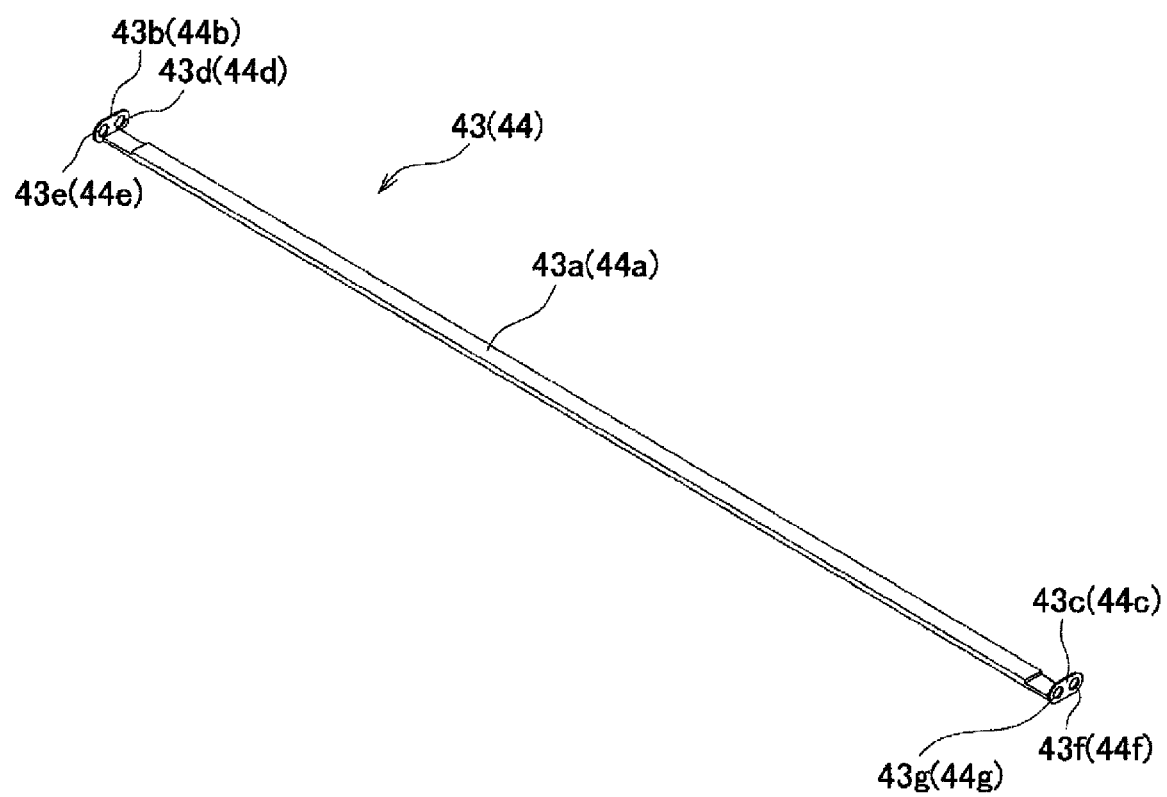
FIG. 16 shows a perspective view of a first shaft end coupling member (as well as a second shaft end coupling member) of a triaxial hinge according to the invention.

In the meantime, a first shaft end coupling member 43 and a second shaft end coupling member 44 are attached to an extended end portion 11a (12a) of a first hinge shaft 11 (12), as well as to an extended end portion 13a of a third hinge shaft 13 (see FIGS. 3 and 16). Both shaft end coupling members play a role of coupling members between the first to the third hinge shafts 11 to 13, in addition to a first coupling member 24 and a second coupling member 26.

Since the first shaft end coupling member 43 has an identical structure with the second shaft end coupling member 44, the description hereinafter mostly relates to the first shaft end coupling member 43, respective reference numerals relevant to the second shaft end coupling member 44 are added in parenthesis to those concerning the first shaft end coupling member 43, and thus redundant explanation is omitted hereinafter. The first shaft end coupling member 43 (44) comprises a main body portion 43a (44a), attaching plate portions 43b, 43c (see FIG. 16) (44b, 44c), attaching holes 43d to 43g (44d to 44g). The attaching hole 43d on one attaching plate portion 43b of the first shaft end coupling member 43 is attached to a stepped portion 11c of an extended end portion 11a of a first hinge shaft 11, and other attaching hole 43e to a stepped portion 13c of an extended end portion 13a of a third hinge shaft 13. The attaching hole 43f on other attaching plate portion 43c (FIG. 16) of the first shaft end coupling member 43 is attached to a stepped portion of an extended end portion of a first hinge shaft having the same structure (not shown in drawings) of the other triaxial hinge 5 attached to a notebook PC shown in FIGS. 1A, 1B and 1C, and similarly, other attaching hole 43g to a stepped portion of an extended end portion of a third hinge shaft having the same structure (not shown in drawings) of the other triaxial hinge 5. In the same manner, the attaching hole 44d on one attaching plate portion 44b of the second shaft end coupling member 44 is attached to a stepped portion 13c of an extended end portion 13a of a third hinge shaft 13, and other attaching hole 44e to a stepped portion 12c of an extended end portion 12a of a second hinge shaft 12. Two attaching holes on other attaching plate portion of a second shaft end coupling member 44 (not shown in the drawings. This also applies hereinafter) are respectively attached to a stepped portion of an extended end portion of a third hinge shaft having the same structure and to a stepped portion of an extended end portion of a second hinge shaft having the same structure of the other triaxial hinge 5 attached to a notebook PC shown in FIGS. 1A, 1B and 1C. In the meantime, a main body portion 43a of the first shaft end coupling member 43 and a main body portion 44a of the second shaft end coupling member 44 also play a role of a cover filling a rear gap formed between a first casing 2 and a second casing 3.

In the following, reference is made to the operation of the triaxial hinge 4 according to the invention as described above. When the notebook PC is held by both hands and only one of the first casing 2 and the second casing 3 is opened and closed relative to other, the synchronous rotation mechanism 15 simultaneously opens and closes the other casing as well. In this manner, the synchronous rotation mechanism 15 plays a role to reduce the time for the opening and closing operation and facilitate the operation. Still further, the third hinge shaft moves forward and backward at the time of the opening and closing operation, and in particular it is located on the rear portion in order to enable the first hinge shaft 11 and the second hinge shaft 12 to approach to each other. This allows for a reduced thickness of the hinges and their suitable use for a thinner electronic device which is a recent trend.

Figure 17A:
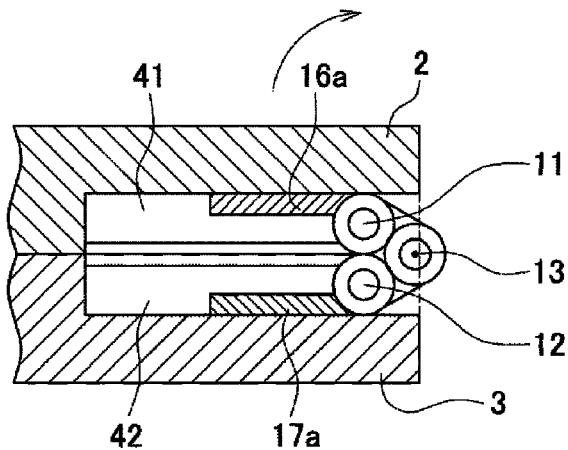
FIGS. 17A, 17B and 17C shows an explanatory view for illustrating an operation of a triaxial hinge according to the invention.
Figure 17B:
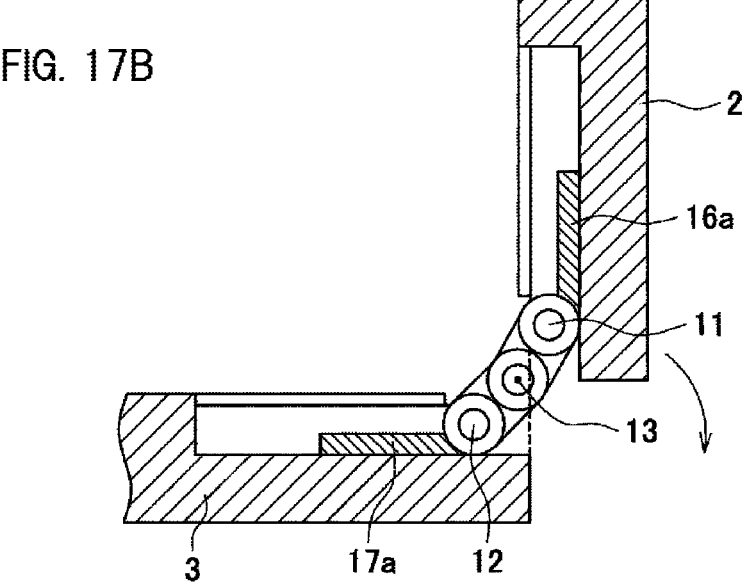

Concretely, as shown in FIGS. 1B and 17B, if e.g. the first casing 2 on the display side is opened clockwise (FIGS. 17A, 17B and 17C) with one hand from a position in which the first casing 2 and the second casing 3 are closed, while the second casing 3 is held by another hand, first, the first bracket 16 attached to the first casing 2 via the first attaching plate 41 rotates clockwise together with the first hinge shaft 11. Here, the drive gears 16h, 16i of the first bracket 16 as well rotate clockwise, and in this manner, the driven gear 18d on one end side of the first turning member 18 and the driven gear 19d on one end side of the second turning member 19—both driven gears meshed with the drive gears—rotate counterclockwise around the third hinge shaft 13. Therefore, the other end side of the first turning member 18 and the other end side of the second turning member 19 rotate counterclockwise around the third hinge shaft 13, and the second hinge shaft 12, having passed through the second circular shaft hole 18c of the first turning member 18 and the second circular shaft hole 19c of the second turning member 19, rotates as well counterclockwise. Hence, the second bracket 17 non-rotatably attached to the second hinge shaft 12 rotates as well counterclockwise around the third hinge shaft 13, therefore, the second casing 3 attached to the second bracket 17 via the second attaching plate 42 also rotates counterclockwise around the third hinge shaft 13. As a result, the first casing 2 and the second casing 3 rotate in different directions, which enhances the efficiency in the opening operation. This also applies to the closing operation, and when the first casing 2 moves in the closing direction, the second casing 3 also moves in the closing direction by means of the synchronous rotation mechanism 15. In this manner, the closing operation is quickly and efficiently accomplished.

In the meantime, the second casing 3 on the keyboard side can be also opened counterclockwise. In this case, when the second casing 3 is opened counterclockwise, first, the second bracket 17 attached to the second casing 3 via the second attaching plate 42 rotates counterclockwise together with the second hinge shaft 12. Here, the drive gears 17h, 17i of the first bracket 17 as well rotate counterclockwise, and in this manner, the driven gear 21d on one end side of the fourth turning member 21 and the driven gear 20d on one end side of the third turning member 20—both driven gears meshed with the drive gears—rotate clockwise around the third hinge shaft 13. Therefore, the other end side of the fourth turning member 21 and the other end side of the third turning member 20 rotate clockwise around the third hinge shaft 13, and the first hinge shaft 11, having passed through the second circular shaft hole 21c of the fourth turning member 21 and the second circular shaft hole 20c of the third turning member 20, rotates as well clockwise. Hence, the first bracket 16 non-rotatably attached to the first hinge shaft 11 rotates as well clockwise around the third hinge shaft 13, therefore, the first casing 2 attached to the first bracket 16 via the first attaching plate 41 also rotates clockwise around the third hinge shaft 13. As a result, the first casing 1 and the second casing 2 rotate in different directions, which enhances the efficiency in the opening operation. This also applies to the closing operation, and when the second casing 3 moves in the closing direction, the first casing 2 also moves in the closing direction by means of the synchronous rotation mechanism 15. In this manner, the closing operation is quickly and efficiently accomplished.

In this manner, if one of the first casing 2 and the second casing 3 is opened and closed using the triaxial hinge 4 according to the invention, the other casing also opens and closes at the same time by means of the synchronous rotation mechanism 15. Therefore, the first casing 2 and the second casing 3 is more easily and more quickly opened and closed, which enhances ease of operation.

Figure 17C:
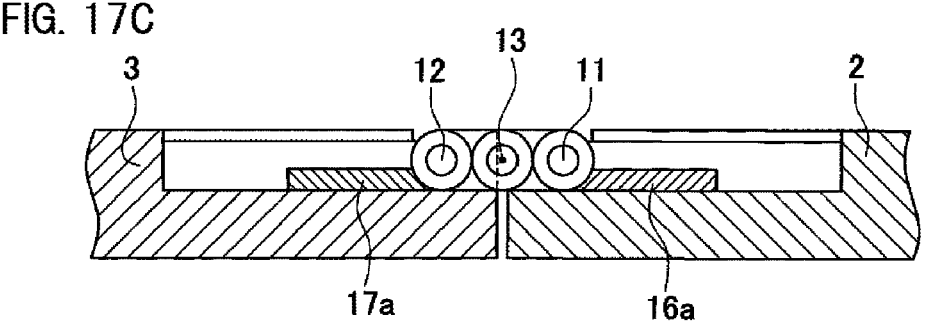

Moreover, in the triaxial hinge 4 according to the invention, the first hinge shaft 11 and the second hinge shaft 12 rotate around the third hinge shaft 13 as fulcrum during the opening and closing operation, here the third hinge shaft 13 moves in forward and backward direction, as accompanied by the opening and closing operation of the first casing 2 and the second casing 3 closed, as shown in FIGS. 17A, 17B and 17C. Especially when the first casing and the second casing are closed as shown in FIG. 17A, the third hinge shaft has moved backward thus escaped from a position where the casings are opened 90 degrees, and the first hinge shaft 11 and the second hinge shaft 12 overlap each other. Therefore, a center distance between the both hinge shafts in the closed state can be substantially reduced as compared to that in case of conventional hinges, which enables a more suitable use of the triaxial hinge for a thinner electronic device such as notebook PC.

During the opening and closing operation of the first casing 2 and the second casing 3 relative to each other, the friction surface 23c of the first friction washer 23 rotating together with the first hinge shaft 11 is brought into press contact with the friction surface 24d of the first coupling member 24 being a counterpart due to the effect of the first elastic means 34a, so that the first friction mechanism 22a of the friction mechanisms 22 generates a friction torque between both friction surfaces; in the same manner, the friction surface 25c of the second friction washer 25 rotating together with the second hinge shaft 12 is brought into press contact with the friction surface 26d of the second coupling member 26 being a counterpart due to the effect of the second elastic means 34b, so that the second friction mechanism 22b generates a friction torque between both friction surfaces. Accordingly, the first casing 2 and the second casing 3 can stably stop at any angular position during their opening and closing operation.

The first drawing mechanism 27a and the second drawing mechanism 27b of the drawing mechanism 27 start functioning slightly before the opening and closing angle of 0, 90 or 180 degrees, so that the first to the fourth cam convex portions 291 to 294 of the first cam follower 29 fall onto the first to the fourth cam concave portions 285 to 288 of the first cam disc 28, and similarly, the first to the fourth cam convex portions 311 to 314 of the second cam follower 31 fall onto the first to the fourth cam concave portions 305 to 308 of the second cam disc 30. In this manner, the drawing mechanism 27 assumes the drawing function, in order to rotatably urge (draw) the first casing 2 and the second casing 3 in the opening direction or the closing direction in an automatic manner. Respective disc springs of the first elastic means 34a and the second elastic means 34b are squeezed and their elastic force is enhanced at a position between the above-mentioned angles, i.e. within a range of angles in which the first to the fourth cam convex portions 291 to 294 of the first cam follower 29 respectively run over the first to the fourth cam convex portions 285 to 288 of the first cam disc 28. This assures a stable stopping effect of the first casing 2 and the second casing 3 at any angular position.

In the meantime, according to embodiments not mentioned above, it is also possible for example for the purpose of a still smaller triaxial hinge that one drive gear only instead of two is used on each of the first bracket 16 and the second bracket 17, and in accordance with the above arrangement, two turning members only instead of four are used. Still further, an elastic means 34 can be replaced with compression coil springs or the ones made of materials such synthetic resin. Still further, driven gears can be disposed only on one end side of each turning member as described above. Accordingly, the present invention encompasses all the variant embodiments to which the skilled person could easily reach starting from the foregoing and drawings, always within the scope of the claims.

The present invention is constructed as described above, therefore, the electronic device such as a notebook PC is structured such that the first casing and the second casing are openable and closable in a synchronized manner, and that the first hinge shaft and the second hinge shaft turn around the third hinge shaft as a fulcrum; here, the third hinge shaft moves in a forward and backward direction, as accompanied by the opening and closing operation of the first casing and the second casing; especially when the first casing and the second casing are closed, the first hinge shaft and the second hinge shaft overlap each other, where the third hinge shaft has moved backward from an electronic device. Therefore, a center distance between the first hinge shaft and the second hinge shaft can be substantially reduced, which can then contribute to a thinner electronic device such as notebook PC. Still further, if one of the first casing and the second casing is opened and closed relative to the other casing, the latter also starts to open and close at the same time as described above, so that it is possible to provide a triaxial hinge which quickly opens and closes the casings as well as enhances efficiency and ease of operation.

What is claimed is:

1. A triaxial hinge which couples a first casing and a second casing, thereby said casings being openable and closable relative to each other, said triaxial hinge comprising:
    a first hinge shaft attached to a first bracket attached to a first attaching plate on a first casing side, a rotation of said first hinge shaft is restrained by said first bracket;
    a second hinge shaft attached to a second bracket attached to a second attaching plate on a second casing side, a rotation of said second hinge shaft is restrained by said second bracket;
    a third hinge shaft coupled to one end portion of a first coupling member and one end portion of a second coupling member, respective other end portions of said first coupling member and said second coupling member being attached to said first hinge shaft; and
    a synchronous rotation mechanism comprising: said first hinge shaft attached to said first bracket, a rotation of said first hinge shaft being restrained by said first bracket; said second hinge shaft attached to said second bracket, a rotation of the second hinge shaft being restrained by said second bracket; drive gears on said first bracket and said second bracket; a turning member comprising a driven gear meshed with said drive gear provided on said first bracket, said third hinge shaft and said second hinge shaft rotatably passing through said turning member; a further turning member comprising a driven gear meshed with said drive gear provided on said second bracket, said third hinge shaft and said first hinge shaft rotatably passing through said further turning member;
    thereby said synchronous rotation mechanism allowing said third hinge shaft to move in a forward and backward direction as accompanied by said opening and closing operation of one of said first casing and said second casing, as well as the other casing to automatically open and close.

2. The triaxial hinge according to claim 1, said synchronous rotation mechanism comprising a stopper means for stopping said first casing and said second casing at a predetermined opening angle.

3. The triaxial hinge according to claim 1, each of said first hinge shaft and said second hinge shaft comprising a friction mechanism.

4. The triaxial hinge according to claim 1, each of said first hinge shaft and said second hinge shaft comprising a drawing mechanism.

5. The triaxial hinge according to claim 1, a first shaft end coupling member being attached to shaft end portions of said first hinge shaft and said third hinge shaft of one triaxial hinge and thereby hung between said shaft end portions and the ones of a first hinge shaft and a third hinge shaft of an adjacent triaxial hinge, and a second shaft end coupling member being attached to shaft end portions of said second hinge shaft and said third hinge shaft of one triaxial hinge and thereby hung between said shaft end portions and the ones of a second hinge shaft and a third hinge shaft of an adjacent triaxial hinge.

6. An electrical device using the triaxial hinge according to claim 1.

* * * * *